US009457573B2

(12) United States Patent
Kodera et al.

(10) Patent No.: US 9,457,573 B2
(45) Date of Patent: Oct. 4, 2016

(54) METHOD FOR MANUFACTURING LIQUID EJECTION HEAD

(71) Applicant: CANON KABUSHIKI KAISHA, Tokyo (JP)

(72) Inventors: Yasuto Kodera, Fujisawa (JP); Toshio Suzuki, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/836,849

(22) Filed: Aug. 26, 2015

(65) Prior Publication Data

US 2016/0059563 A1 Mar. 3, 2016

(30) Foreign Application Priority Data

Aug. 29, 2014 (JP) ................................ 2014-175513

(51) Int. Cl.

| | |
|---|---|
| ***G01D 15/00*** | (2006.01) |
| ***G11B 5/127*** | (2006.01) |
| ***B41J 2/16*** | (2006.01) |
| ***B41J 2/14*** | (2006.01) |

(52) U.S. Cl.

CPC ............. *B41J 2/162* (2013.01); *B41J 2/14233* (2013.01); *B41J 2/161* (2013.01); *B41J 2/164* (2013.01); *B41J 2/1606* (2013.01); *B41J 2/1623* (2013.01); *B41J 2/1628* (2013.01); *B41J 2/1631* (2013.01)

(58) Field of Classification Search

CPC ................................ B41J 2/161; B41J 2/162
USPC ............................................... 216/27; 347/47
See application file for complete search history.

(56) References Cited

FOREIGN PATENT DOCUMENTS

JP 2012-96499 A 5/2012

*Primary Examiner* — Roberts Culbert
(74) *Attorney, Agent, or Firm* — Canon U.S.A. Inc., IP Division

(57) ABSTRACT

A method of manufacturing a liquid ejection head includes forming a hole in an SOI substrate including a first silicon layer, a second silicon layer, and a silicon oxide layer interposed between the first and second silicon layers such that the hole extends through the first silicon layer and the silicon oxide layer to the second silicon layer, forming a first protective film on the first silicon layer and an inner wall of the hole, forming a water-repellent film on the first protective film, attaching a support substrate to part of the water-repellent film facing away from the first silicon layer, removing the second silicon layer to remove a bottom of the hole, removing part of the water-repellent film disposed on the inner wall of the hole, and releasing the support substrate from the water-repellent film.

10 Claims, 5 Drawing Sheets

METHOD FOR MANUFACTURING LIQUID EJECTION HEAD

BACKGROUND OF THE INVENTION

1. Field of the Invention

The present invention relates to a method of manufacturing a liquid ejection head including a nozzle plate for liquid ejection.

2. Description of the Related Art

Liquid ejection heads are widely used for a variety of purposes ranging from image recording to industrial purposes, such as drawing a wiring pattern with liquid containing a conductive material. Particularly, liquid ejection heads from which liquid is ejected by driving a piezoelectric member are widely used because these heads are capable of ejecting various kinds of liquid. There is a growing need for liquid ejection heads to achieve higher-density and higher-accuracy ejection. A typical liquid ejection head includes a nozzle plate having a plurality of ejection ports for liquid ejection and a cavity substrate joined to the nozzle plate. The cavity substrate has pressure chambers communicating with the ejection ports and passages. In this liquid ejection head, applying pressure to the pressure chamber ejects liquid from the ejection port. Many of nozzle plates include a silicon substrate having ejection ports processed by dry etching or the like based on requests to define an ejection port diameter with high accuracy. A variation in thickness of the nozzle plate causes a variation in flow resistance of liquid to be ejected from the ejection ports. The nozzle plate accordingly should have little variation in thickness. If liquid to be ejected is alkaline ink, the ink may corrode silicon. Accordingly, part, including an inner wall of each ejection port, exposed to the ink is typically coated with an ink-resistant protective film.

Japanese Patent Laid-Open No. 2012-96499 discloses a method of manufacturing a nozzle plate including a silicon-on-insulator (SOI) substrate having a structure in which silicon films sandwich a silicon oxide film functioning as an ink-resistant protective film. The nozzle plate disclosed in Japanese Patent Laid-Open No. 2012-96499 includes a water-repellent film disposed on an ejection surface having openings of ejection ports. This water-repellent film prevents adhesion of ink to the ejection surface, thus increasing liquid ejection stability.

According to the method disclosed in Japanese Patent Laid-Open No. 2012-96499, the water-repellent film is formed on the nozzle plate by dip coating or evaporation as a final step of the method. Disadvantageously, the water-repellent film may be disposed on an inner wall of each ejection port as well as the ejection surface at completion of the nozzle plate. The water-repellent film on the inner wall of the ejection port may interfere with straight flow of liquid through the ejection port, causing a variation in flying direction of the liquid.

SUMMARY OF THE INVENTION

The present invention provides a method of manufacturing a liquid ejection head having an ejection port through which liquid is ejected, the method including forming a hole in an SOI substrate including a first silicon layer, a second silicon layer, and a silicon oxide layer interposed between the first and second silicon layers such that the hole extends through the first silicon layer and the silicon oxide layer to the second silicon layer, forming a first protective film on the first silicon layer and an inner wall of the hole to protect the first silicon layer against the liquid, forming a water-repellent film on the first protective film, attaching a support substrate to part of the water-repellent film facing away from the first silicon layer, removing the second silicon layer to remove a bottom of the hole, removing part of the water-repellent film disposed on the inner wall of the hole, and releasing the support substrate from the water-repellent film.

According to the present invention, while the part of the water-repellent film facing away from the first silicon layer is being protected by the support substrate, the water-repellent film disposed on the inner wall of the hole is removed. After that, the support substrate is removed. Consequently, the water-repellent film reliably remains on an ejection surface which requires the water-repellent film. The water-repellent film on the inner wall, which requires no water-repellent film, of the hole, serving as the ejection port, is removed.

Further features of the present invention will become apparent from the following description of exemplary embodiments with reference to the attached drawings.

DESCRIPTION OF THE EMBODIMENTS

First Embodiment

Figure 1:
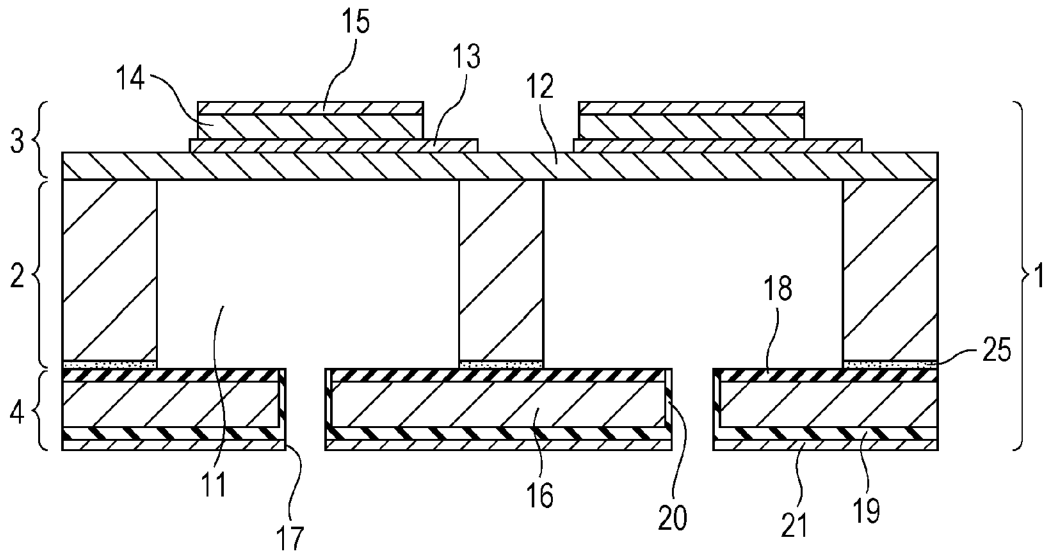
FIG. 1 is a sectional view of a liquid ejection head manufactured by a manufacturing method according to the present invention.

FIG. 1 is a sectional view of a liquid ejection head manufactured by a manufacturing method according to the present invention. As illustrated in FIG. 1, a liquid ejection head 1 includes a cavity substrate 2, an actuator 3, and a nozzle plate 4. The cavity substrate 2 has liquid chambers 11. The actuator 3 is secured to the cavity substrate 2 such that the actuator 3 is disposed on the liquid chambers 11. Inside each liquid chamber 11, a portion to be in contact with liquid (ink in a first embodiment) is coated with an ink-resistant protective film (not illustrated). The actuator 3 has a structure in which a vibrating plate 12, lower electrodes 13, piezoelectric members 14, and upper electrodes 15 are laminated in sequence. The nozzle plate 4 includes a first silicon layer 16 and has ejection ports 17 extending through the first silicon layer 16 and communicating with the respective liquid chambers 11. The nozzle plate 4 further includes a silicon oxide layer 18 disposed on a surface of the first silicon layer 16 adjacent to the liquid chambers 11 and a first protective film 19 disposed on a surface of the first silicon layer 16 remote from the liquid chambers 11. The first protective film 19 extends over an inner wall of each ejection port 17. The silicon oxide layer 18 and the first protective film 19 each function as an ink-resistant protective film. Most of the first protective film 19 is covered with a water-repellent film 21.

In the liquid ejection head 1 with the above-described configuration, when a pulse voltage is applied between each upper electrode 15 and the corresponding lower electrode 13, the piezoelectric member 14 deforms. The deformation of the piezoelectric member 14 causes the vibrating plate 12 to bend. Thus, a pressure inside the liquid chamber 11 changes, so that the ink is ejected from an opening of the ejection port 17. The liquid ejection head 1 in the present embodiment is of a piezoelectric type in which a piezoelectric transducer is used as the piezoelectric member 14. The present invention is not limited to such a piezoelectric type liquid ejection head, but is applicable to any liquid ejection head including a nozzle plate.

A method of manufacturing the liquid ejection head according to the present embodiment will now be described. FIGS. 2A to 3D are sectional views illustrating steps for manufacturing the liquid ejection head in accordance with the present embodiment.

Figure 2A:
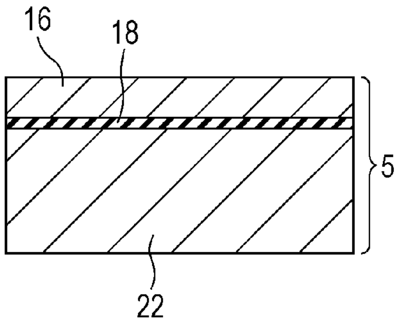
FIGS. 2A to 2F are sectional views illustrating steps for manufacturing a liquid ejection head according to a first embodiment.

FIG. 2A illustrates a step of preparing an SOI substrate 5 including the first silicon layer 16, a second silicon layer 22, and the silicon oxide layer 18 sandwiched between the layers 16 and 22. In this embodiment, the silicon oxide layer 18 has a thickness of 0.5 μm, the first silicon layer 16 has a thickness of 10 μm, and the second silicon layer 22 has a thickness of 525 μm.

Figure 2D:
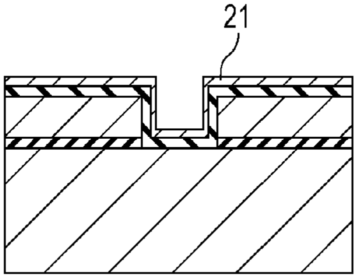
Figure 2B:
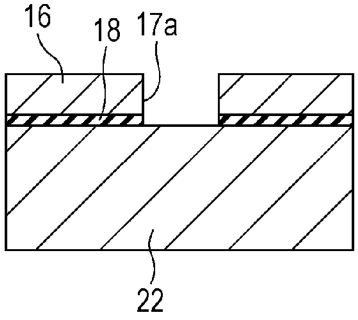

Next, a step illustrated in FIG. 2B is performed. FIG. 2B illustrates forming a hole 17*a* in the SOI substrate 5. The hole 17*a* is to be the ejection port 17. Referring to FIG. 2B, the hole 17*a* extends through the first silicon layer 16 and the silicon oxide layer 18 to the second silicon layer 22. In the present embodiment, the hole 17*a* has a diameter ϕ of 20 μm. According to the present embodiment, a resist pattern is formed on the surface of the first silicon layer 16, and the first silicon layer 16 is then subjected to hole formation by deep reactive ion etching (deep-RIE). After that, the silicon oxide layer 18 is dry-etched to remove the resist pattern, thus forming the hole 17*a*.

Figure 2E:
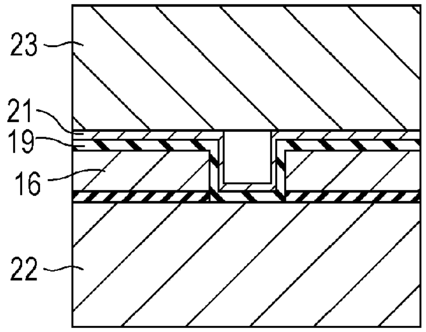
Figure 2C:
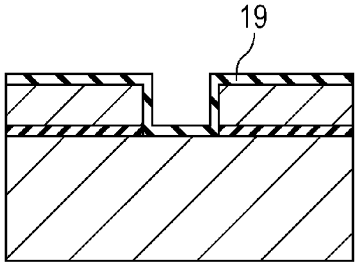

Then, a step illustrated in FIG. 2C is performed. FIG. 2C illustrates forming the first protective film 19 on the first silicon layer 16 and the inner wall of the hole 17*a*. As regards a material of the first protective film 19, a material resistant to alkaline ink, such as but not limited to silicon oxide, silicon nitride, or tantalum oxide, can be used. In the present embodiment, the first protective film 19 is a silicon oxide film having a thickness of 0.2 μm formed by thermal oxidation. This silicon oxide film is also formed on a bottom of the hole 17*a*.

Then, a step illustrated in FIG. 2D is performed. FIG. 2D illustrates forming the water-repellent film 21 on the first protective film 19. The water-repellent film 21 is formed in such a manner that a film composed of a compound containing fluorine is formed by using a spin coater or by dipping or vacuum evaporation, for example. In the present embodiment, the water-repellent film 21 is formed by vacuum evaporation. The water-repellent film 21 also extends over the inner wall of the hole 17*a*.

Then, a step illustrated in FIG. 2E is performed. FIG. 2E illustrates attaching a support substrate 23 to part of the water-repellent film 21 facing away from the first silicon layer 16. In the present embodiment, the support substrate 23 is a glass substrate having a thickness of 525 μm. The support substrate 23 is attached to the water-repellent film 21 with a thermally releasable double-sided adhesive tape (not illustrated) available from Nitto Denko Corporation.

Figure 2F:
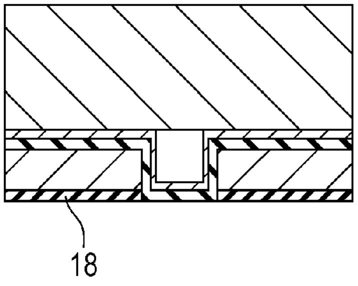

Then, a step illustrated in FIG. 2F is performed. FIG. 2F illustrates removing the second silicon layer 22, serving as a handle layer of the SOI substrate 5. In the present embodiment, the support substrate 23 is fixed and the second silicon layer 22 is reduced in thickness by approximately 500 μm with a grinder. After that, the remaining second silicon layer 22 is dry-etched by using the silicon oxide layer 18 as a stop layer. Thus, the second silicon layer 22 is substantially completely removed. Any other methods of removing the second silicon layer 22 may be used. The above-described removing method may include wet etching. After removal of the second silicon layer 22, part of the first protective film 19 and part of the water-repellent film 21 which define the bottom of the hole 17*a* are left. The hole 17*a* accordingly still has a closed end.

After the step illustrated in FIG. 2F, the SOI substrate 5 is a thin plate having a thickness of approximately 10 μm. A small thickness of the SOI substrate 5 would lead to a decrease in ease of handling of the SOI substrate 5 to be bonded to the cavity substrate 2, so that the SOI substrate 5 would be broken. In the present embodiment, however, the SOI substrate 5 from which the second silicon layer 22 has been removed is attached to the support substrate 23 and accordingly exhibits ease of handling, which reduces a likelihood that the SOI substrate 5 may be broken.

Figure 3A:
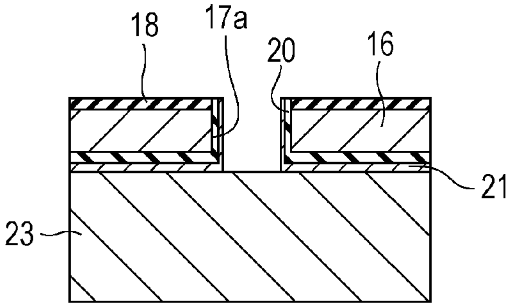
FIGS. 3A to 3D are sectional views illustrating steps for manufacturing the liquid ejection head according to the first embodiment.

Then, a step illustrated in FIG. 3A is performed. FIG. 3A illustrates removing the part of the first protective film 19 and the part of the water-repellent film 21, which define the bottom of the hole 17*a,* to remove the bottom of the hole 17*a*. In the present embodiment, anisotropic dry etching is used in order to prevent part 20 of the first protective film 19 disposed on the inner wall of the hole 17*a* from being etched and removed after removal of the bottom of the hole 17*a*. In this embodiment, since the first protective film 19 is the silicon oxide film, the silicon oxide layer 18 is also etched at the same time. Accordingly, the first protective film 19 should be thinner than the silicon oxide layer 18. To prevent the silicon oxide layer 18 from being etched, anisotropic etching may be performed while the silicon oxide layer 18 is being protected by a resist mask.

Figure 3B:
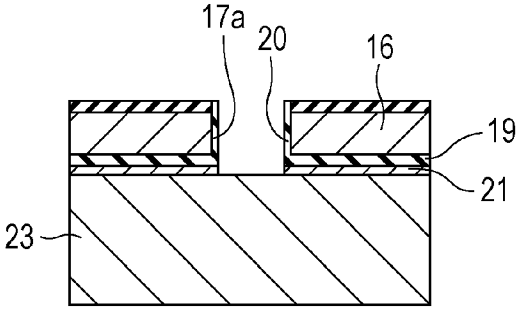

Then, a step illustrated in FIG. 3B is performed. FIG. 3B illustrates removing part of the water-repellent film 21 disposed on the inner wall of the hole 17*a*. In the present embodiment, oxygen plasma processing is performed through a bottom opening of the hole 17*a* formed in the step illustrated in FIG. 3A, thus decomposing and removing the water-repellent film 21. Since another part of the water-repellent film 21 disposed on the first protective film 19 is in tight contact with the support substrate 23, this part is not removed. In this step, the part 20 of the first protective film 19 disposed on the inner wall of the hole 17*a* is exposed, thus protecting the first silicon layer 16 against the alkaline ink flowing through the hole 17*a* (or the ejection port 17).

Figure 3C:
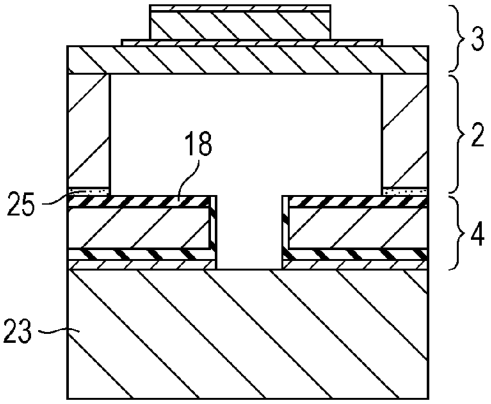

Then, a step illustrated in FIG. 3C is performed. FIG. 3C illustrates bonding the cavity substrate 2, to which the actuator 3 is secured, to the silicon oxide layer 18. In the present embodiment, the cavity substrate 2 is bonded to the silicon oxide layer 18 with an adhesive 25.

Figure 3D:
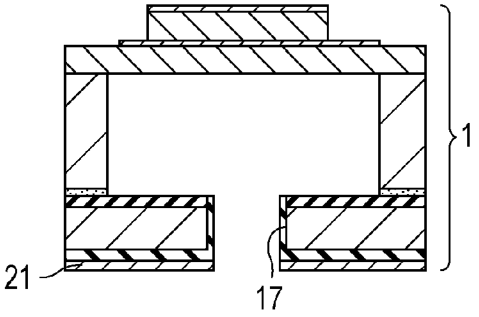

Finally, a step illustrated in FIG. 3D is performed. FIG. 3D illustrates releasing the support substrate 23 from the water-repellent film 21. In the present embodiment, after the adhesive 25 is cured, the support substrate 23 is heated to 170° C. This heating causes the above-described thermally releasable double-sided adhesive tape (not illustrated) to be released, thus releasing the support substrate 23. Consequently, the ejection port 17 is formed, thus completing the liquid ejection head 1.

According to the above-described method of the present embodiment, the part of the water-repellent film 21 facing away from the first silicon layer 16 is protected by the support substrate 23 and the part of the water-repellent film 21 disposed on the inner wall of the hole 17*a* is removed. In other words, needed part of the water-repellent film 21 is left and unneeded part of the water-repellent film 21 is removed. The ink is therefore permitted to flow straight through the hole 17*a* (or the ejection port 17). Consequently, the flying direction of the ink is stabilized, thus enhancing uniformity of ejection performance.

The method according to the present embodiment includes attaching the support substrate 23 to the SOI substrate 5 (the water-repellent film 21). This prevents the ease of handling of the SOI substrate 5 from decreasing if the SOI substrate 5 is thinned due to removal of the second silicon layer 22, thus protecting the SOI substrate 5 from breakage. This can improve manufacturing yield.

Second Embodiment

A method of manufacturing a liquid ejection head according to a second embodiment of the present invention will be described below. FIGS. 4A to 5E are sectional views illustrating steps for manufacturing the liquid ejection head in accordance with the present embodiment. The same components as those in the liquid ejection head 1 in the above-described first embodiment are designated by the same reference numerals and a detailed description of these components is omitted.

Figure 4A:
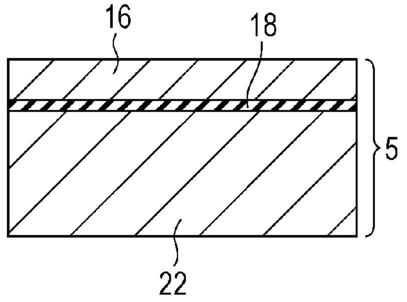
FIGS. 4A to 4F are sectional views illustrating steps for manufacturing a liquid ejection head according to a second embodiment.

FIG. 4A illustrates a step of preparing an SOI substrate 5 including a first silicon layer 16, a second silicon layer 22, and a silicon oxide layer 18 interposed between the layers 16 and 22. In the present embodiment, the SOI substrate 5 has the same size as that in the first embodiment.

Figure 4D:
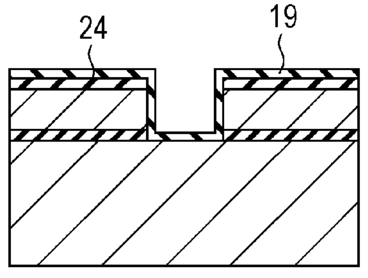
Figure 4B:
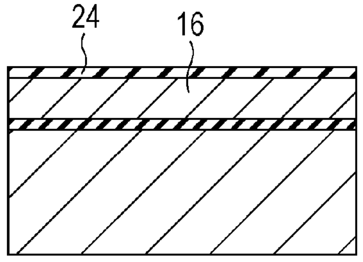

Next, a step illustrated in FIG. 4B is performed. FIG. 4B illustrates forming a second protective film 24 on the first silicon layer 16. In the present embodiment, the second protective film 24 is a silicon oxide film having a thickness of 0.5 μm formed by thermal oxidation.

Figure 4E:
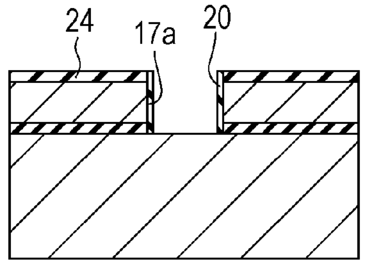
Figure 4C:
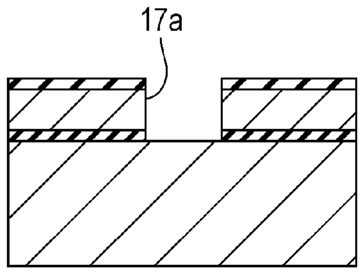

FIG. 4C illustrates a step of forming a hole 17*a* in a manner similar to the first embodiment. In the second embodiment, the hole 17*a* has a diameter ϕ of 20 μm. In the present embodiment, a resist pattern is formed on the second protective film 24, the second protective film 24 is then dry-etched, and after that, the first silicon layer 16 is subjected to hole formation by deep-RIE. Subsequently, the silicon oxide layer 18 is dry-etched to remove the above-described resist, thus forming the hole 17*a*.

Then, a step illustrated in FIG. 4D is performed. FIG. 4D illustrates forming a first protective film 19 on the second protective film 24 and an inner wall of the hole 17*a*. In the present embodiment, the first protective film 19 is a silicon oxide film having a thickness of 0.2 μm formed by thermal oxidation. This silicon oxide film is also formed on a bottom of the hole 17*a*.

Then, a step illustrated in FIG. 4E is performed. FIG. 4E illustrates removing the silicon oxide film, serving as the first protective film 19, disposed on the bottom of the hole 17*a*. In the present embodiment, anisotropic dry etching is used in order to prevent part 20 of the first protective film 19 disposed on the inner wall of the hole 17*a* from being etched and removed. In this embodiment, not only the part of the first protective film 19 disposed on the bottom of the hole 17*a* but also part thereof disposed on the second protective film 24 are etched at the same time. Although these parts of the first protective film 19 are removed, the second protective film 24 is left. In the embodiment, the second protective film 24 has substantially the same thickness as that of the silicon oxide layer 18. These members disposed on both surfaces of the first silicon layer 16, included in a thin nozzle plate 4, accordingly apply the same stress to the first silicon layer 16, thus preventing the nozzle plate 4 from warping. Consequently, the nozzle plate 4 can be uniformly bonded to a cavity substrate 2, which will be described later.

Figure 4F:
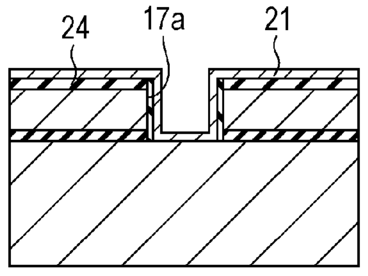

Then, a step illustrated in FIG. 4F is performed. FIG. 4F illustrates forming a water-repellent film 21 on the second protective film 24 and the part 20 of the first protective film 19. In the present embodiment, the water-repellent film 21 is formed such that a film composed of a compound containing fluorine is formed by vacuum evaporation.

Figure 5A:
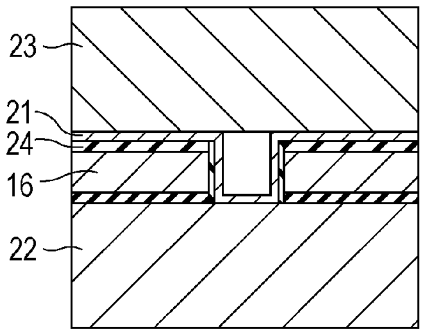
FIGS. 5A to 5E are sectional views illustrating steps for manufacturing the liquid ejection head according to the second embodiment.

Then, a step illustrated in FIG. 5A is performed. FIG. 5A illustrates attaching a support substrate 23 to part of the water-repellent film 21 facing away from the first silicon layer 16. In the present embodiment, the support substrate 23 is a glass substrate as in the first embodiment. The support substrate 23 is attached to the water-repellent film 21 with a thermally releasable double-sided adhesive tape (not illustrated) available from Nitto Denko Corporation.

Figure 5B:
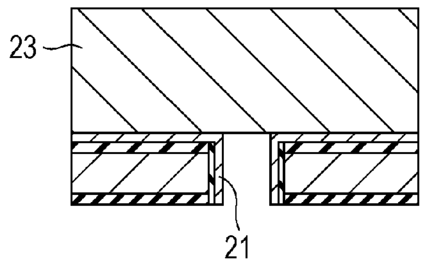

Then, a step illustrated in FIG. 5B is performed. FIG. 5B illustrates removing the second silicon layer 22, serving as a handle layer of the SOI substrate 5. In the present embodiment, the second silicon layer 22 is removed in a manner similar to the first embodiment. As different from the first embodiment, part of the water-repellent film 21 disposed on the bottom of the hole 17*a* is removed together with the second silicon layer 22 in this step. Thus, the bottom of the hole 17*a* is removed.

Figure 5C:
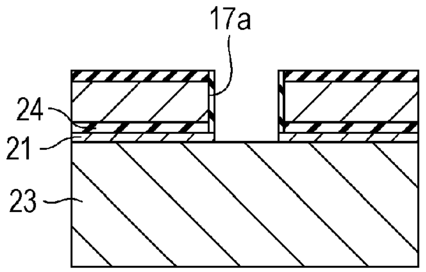

Then, a step illustrated in FIG. 5C is performed. FIG. 5C illustrates removing part of the water-repellent film 21 disposed on the inner wall of the hole 17*a*. In the present embodiment, oxygen plasma processing is performed through a bottom opening of the hole 17*a* in a manner similar to the first embodiment, thus decomposing and removing the water-repellent film 21. Since part of the water-repellent film 21 disposed on the second protective film 24 is in tight contact with the support substrate 23, this part is not removed.

Figure 5D:
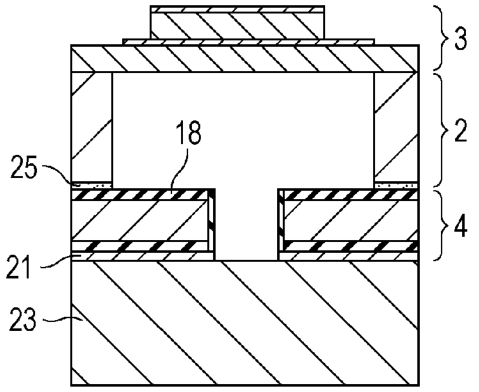

Then, a step illustrated in FIG. 5D is performed. FIG. 5D illustrates bonding the cavity substrate 2, to which an actuator 3 is secured, to the silicon oxide layer 18. In the present embodiment, the cavity substrate 2 is bonded to the silicon oxide layer 18 with an adhesive 25 in a manner similar to the first embodiment.

Figure 5E:
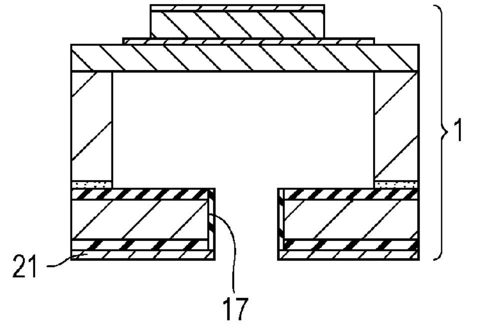

Finally, a step illustrated in FIG. 5E is performed. FIG. 5E illustrates releasing the support substrate 23 from the water-repellent film 21. In the present embodiment, after the adhesive 25 is cured, the support substrate 23 is heated to 170° C. This heating causes the above-described thermally releasable double-sided adhesive tape (not illustrated) to be released, thus releasing the support substrate 23. Consequently, the ejection port 17 is formed, thus completing a liquid ejection head 1.

According to the above-described method of the second embodiment, needed part of the water-repellent film 21 is left and unneeded part of the water-repellent film 21 is removed as in the first embodiment. Consequently, the flying direction of ink is stabilized, thus achieving the uniformity of ejection performance. In addition, attaching the support substrate 23 to the SOI substrate 5 prevents the ease of handling of the SOI substrate 5 from decreasing, thus improving the manufacturing yield.

Particularly, the second protective film 24 is formed prior to the formation of the hole 17*a* in the present embodiment.

Additionally, the part of the first protective film 19 disposed on the bottom of the hole 17*a* is removed prior to the formation of the water-repellent film 21. Simultaneously with the removal of this part, the first protective film 19 disposed on the second protective film 24 is also removed. Although the first protective film 19 is removed, the second protective film 24 is left. Consequently, the second protective film 24 can protect the first silicon layer 16 against the ink if etching conditions for completely removing the part of the first protective film 19 disposed on the bottom of the hole 17*a* are used. Note that setting an appropriate etching selection ratio for the first protective film 19 and the silicon oxide layer 18 and appropriate thicknesses of these members can leave the protective film for protecting the first silicon layer 16 against the ink in the first embodiment.

According to the present invention, since the water-repellent film disposed on the inner wall of the hole is removed, liquid is permitted to flow straight through the hole (or the ejection port). Consequently, the flying direction of the liquid is stabilized, thus enhancing the uniformity of ejection performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-175513, filed Aug. 29, 2014, which is hereby incorporated by reference herein in its entirety.

What is claimed is:

1. A method of manufacturing a liquid ejection head having an ejection port through which liquid is ejected, the method comprising:

(a) forming a hole in an SOI substrate including a first silicon layer, a second silicon layer, and a silicon oxide layer interposed between the first and second silicon layers such that the hole extends through the first silicon layer and the silicon oxide layer to the second silicon layer;

(b) forming a first protective film on the first silicon layer and an inner wall of the hole to protect the first silicon layer against the liquid;

(c) forming a water-repellent film on the first protective film;

(d) attaching a support substrate to part of the water-repellent film facing away from the first silicon layer;

(e) removing the second silicon layer to remove a bottom of the hole;

(f) removing part of the water-repellent film disposed on the inner wall of the hole; and (g) releasing the support substrate from the water-repellent film.

2. The method according to claim 1, further comprising:

after step (f) and before step (g), bonding a cavity substrate having a liquid chamber communicating with the hole to the silicon oxide layer.

3. The method according to claim 1, wherein removing part of the first protective film disposed on the bottom of the hole and the water-repellent film disposed on the part removes the bottom of the hole.

4. The method according to claim 1, wherein the first protective film has a smaller thickness than the silicon oxide layer.

5. The method according to claim 1, further comprising:

before step (a), forming a second protective film on the first silicon layer; and after step (b) and before step (c), removing the first protective film disposed on the second protective film and the bottom of the hole.

6. The method according to claim 5, wherein the second protective film has a thickness identical to that of the silicon oxide layer.

7. The method according to claim 1, wherein the water-repellent film is removed by oxygen plasma processing.

8. A method of manufacturing a liquid ejection head having an ejection port through which liquid is ejected, the method comprising:

(a) preparing a substrate including, in sequence, a first silicon layer, a silicon oxide layer, and a second silicon layer;

(b) partly removing the first silicon layer and the silicon oxide layer of the substrate to form a hole in the first silicon layer and forming a protective film on the first silicon layer and an inner surface of the hole;

(c) forming a water-repellent film to cover the protective film;

(d) disposing a support substrate on the water-repellent film;

(e) removing the second silicon layer and a bottom of the hole; and (f) removing the support substrate.

9. The method according to claim 8, wherein step (c) includes forming the water-repellent film on at least the inner surface of the hole.

10. The method according to claim 8, further comprising:

after step (e), disposing another substrate provided with an actuator for ejecting the liquid on a surface of the substrate remote from the support substrate.

* * * * *